US012777225B2

(12) United States Patent
Zhang et al.

(10) Patent No.: US 12,777,225 B2
(45) Date of Patent: Oct. 27, 2026

(54) CONTENT PRESENTATION METHOD AND APPARATUS, DEVICE, AND STORAGE MEDIUM

(71) Applicant: Beijing Zitiao Network Technology Co., Ltd., Beijing (CN)

(72) Inventors: Shengjun Zhang, Beijing (CN); Xiaoshuang Bai, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/627,738

(22) Filed: Apr. 5, 2024

(65) Prior Publication Data

US 2024/0251133 A1 Jul. 25, 2024

Related U.S. Application Data

(63) Continuation of application No. PCT/CN2022/137801, filed on Dec. 9, 2022.

(30) Foreign Application Priority Data

Dec. 14, 2021 (CN) ......................... 202111530236.2

(51) Int. Cl.
*H04N 21/466* (2011.01)
*H04N 21/431* (2011.01)

(52) U.S. Cl.
CPC ......... *H04N 21/466* (2013.01); *H04N 21/431* (2013.01)

(58) Field of Classification Search
CPC ........................... H04N 21/466; H04N 21/431
See application file for complete search history.

(56) References Cited

U.S. PATENT DOCUMENTS

2015/0358420 A1 12/2015 Mese et al.
2016/0277802 A1* 9/2016 Bernstein ......... H04N 21/44213
(Continued)

FOREIGN PATENT DOCUMENTS

CN 108924030 A 11/2018
CN 110209952 A 9/2019
(Continued)

OTHER PUBLICATIONS

China National Intellectual Property Administration, Office Action and Search Report Issued in Application No. 202111530236.Mar. 2, 31, 2023, 10 pages.
(Continued)

*Primary Examiner* — Oschta I Montoya
(74) *Attorney, Agent, or Firm* — Alleman Hall LLP

(57) ABSTRACT

Embodiments of the present disclosure disclose a content presentation method and apparatus, a device, and a storage medium. The method includes: displaying a preset media content stream presentation interface; and presenting a first preset media content in the preset media content stream on the preset media content stream presentation interface, wherein a content in the preset media content stream and the first user have a preset association relationship; the preset association relationship is initiated and created by at least one second user; a target preset association relationship between the first preset media content and the first user have is initiated and created by a target second user.

14 Claims, 6 Drawing Sheets

(56) References Cited

U.S. PATENT DOCUMENTS

| | | | | |
|---|---|---|---|---|
| 2023/0308403 | A1* | 9/2023 | Tao | H04L 51/04 |
| 2024/0143134 | A1* | 5/2024 | Ryan | G06F 3/04817 |

FOREIGN PATENT DOCUMENTS

| | | | |
|---|---|---|---|
| CN | 111432264 | A | 7/2020 |
| CN | 111523053 | A | 8/2020 |
| CN | 111580922 | A | 8/2020 |
| CN | 111596823 | A | 8/2020 |
| CN | 111670437 | A | 9/2020 |
| CN | 112073740 | A | 12/2020 |
| CN | 112445389 | A | 3/2021 |
| CN | 113238823 | A | 8/2021 |
| CN | 113688334 | A | 11/2021 |
| CN | 113726640 | A | 11/2021 |
| CN | 114238673 | A | 3/2022 |
| WO | 2017076315 | A1 | 5/2017 |
| WO | 2021238884 | A1 | 12/2021 |

OTHER PUBLICATIONS

ISA China National Intellectual Property Administration, International Search Report Issued in Application No. PCT/ CN2022/137801, Feb. 20, 2023, WIPO, 7 pages.

ISA China National Intellectual Property Administration, Written Opinion of the International Searching Authority Issued in Application No. PCT/CN2022/137801, Jan. 30, 2023, WIPO, 4 pages.

China National Intellectual Property Administration, Notice of Rejection Issued in Application No. 202111530236.2 , Sep. 28, 2023, 13 pages.

China National Intellectual Property Administration, Patent Grant Issued in Application No. 202111530236.2, May 20, 2024, 3 pages.

European Patent Office, Extended European Search Report Issued in Application No. 22906413.4, Oct. 27, 2025, Germany, 9 pages.

* cited by examiner

CONTENT PRESENTATION METHOD AND APPARATUS, DEVICE, AND STORAGE MEDIUM

CROSS-REFERENCE TO RELATED APPLICATION(S)

The present disclosure is a Continuation Application of PCT Application Serial No. PCT/CN2022/137801, filed Dec. 9, 2022, which claims priority to Chinese Patent Application No. 202111530236.2, filed with the China National Intellectual Property Administration on Tuesday, Dec. 14, 2021, the disclosure of which are incorporated herein by reference in their entireties.

FIELD

Embodiments of the present disclosure relate to the field of Internet technologies, for example, to a content presentation method and apparatus, a device, and a storage medium.

BACKGROUND

With the rapid development of Internet technology, various application programs have emerged one after another, providing users with increasingly rich interaction methods and experiences.

In some application platforms, users can be allowed to view contents in various forms, such as text, image, audio, or video. At present, many application programs support interactions between users based on the above contents. For example, user A can share a certain content to user B, and user B would receive information to view the content. This information usually exists on a conversation interface. User B needs to enter a conversation interface of user A from an information list interface and jump to a content view interface on the basis of the information to view the shared content. If user B needs to view another shared content, user B needs to go back to the conversation interface or even to the information list interface to enter a conversation interface of another user to view a content shared by the another user (such as user C). When user B needs to view a large quantity of shared contents, user B needs to repeatedly perform switching between the content view interface and the conversation interface, which is cumbersome and inefficient.

SUMMARY

The embodiments of the present disclosure provide a content presentation method and apparatus, a storage medium, and a device, which can optimize the existing content presentation schemes.

In a first aspect, the embodiments of the present disclosure provide a content presentation method, applied at the first user side and including:

- displaying a preset media content stream presentation interface for presenting a preset media content stream; and
- presenting a first preset media content in the preset media content stream on the preset media content stream presentation interface, wherein a preset media content in the preset media content stream and the first user have a preset association relationship; the preset association relationship is initiated and created by at least one second user; the first preset media content and the first user have a target preset association relationship included in the preset association relationship; and the target preset association relationship is initiated and created by a target second user.

In a second aspect, the embodiments of the present disclosure provide a content presentation apparatus, configured on the first user side and including:

- an interface display module, configured to display a preset media content stream presentation interface; and
- a content presentation module, configured to present a first preset media content in the preset media content stream on the preset media content stream presentation interface, wherein a preset media content in the preset media content stream and the first user have a preset association relationship; the preset association relationship is initiated and created by at least one second user; the first preset media content and the first user have a target preset association relationship included in the preset association relationship; and the target preset association relationship is initiated and created by a target second user.

In a third aspect, the embodiments of the present disclosure provide an electronic device, including a memory, a processor, and a computer program stored on the memory and runnable on the processor, wherein the processor, when executing the computer program, implements the content presentation method according as mentioned in the embodiments of the present disclosure.

In a fourth aspect, the embodiments of the present disclosure further provide a computer-readable storage medium. The computer-readable storage medium stores a computer program. The computer program, when executed by a processor, implements the content presentation method according as mentioned in the embodiments of the present disclosure.

DETAILED DESCRIPTION OF THE EMBODIMENTS

The embodiments of the present disclosure will be described below with reference to the accompanying drawings. Although the accompanying drawings show some embodiments of the present disclosure, it should be understood that the present disclosure can be implemented in various forms, and these embodiments are provided for understanding the present disclosure more thoroughly and completely. It should be understood that the accompanying drawings and embodiments of the present disclosure are only used for illustration.

It should be understood that multiple steps recorded in method implementations of the present disclosure can be executed in different orders and/or in parallel. In addition, the method implementations may include additional steps and/or omit the execution of the steps shown.

The term "include" and its variants as used herein mean widespread inclusion, namely, "including but not limited to". The term "based on" is "based at least in part on". The term "one embodiment" means "at least one embodiment". The term "another embodiment" means "at least another embodiment". The term "some embodiments" means "at least some embodiments". Relevant definitions of other terms will be given in the description below.

It should be noted that the concepts such as "first" and "second" mentioned in the present disclosure are only used to distinguish different apparatuses, modules, or units, and are not intended to limit the order or interdependence of the functions performed by these apparatuses, modules, or units.

It should be noted that the modifications of "one" and "plurality" mentioned in the present disclosure are indicative rather than restrictive, and those skilled in the art should understand that unless otherwise explicitly stated in the context, they should be understood as "one or more".

Information or names of information exchanged between a plurality of apparatuses in the implementations of the present disclosure are only for illustrative purposes and are not intended to limit the information or the scope of the information.

In the following embodiments, optional features and examples are provided simultaneously in each embodiment, and multiple features recorded in the embodiments can be combined to form multiple optional schemes. Each numbered embodiment should not be considered as only one technical solution.

Figure 1:
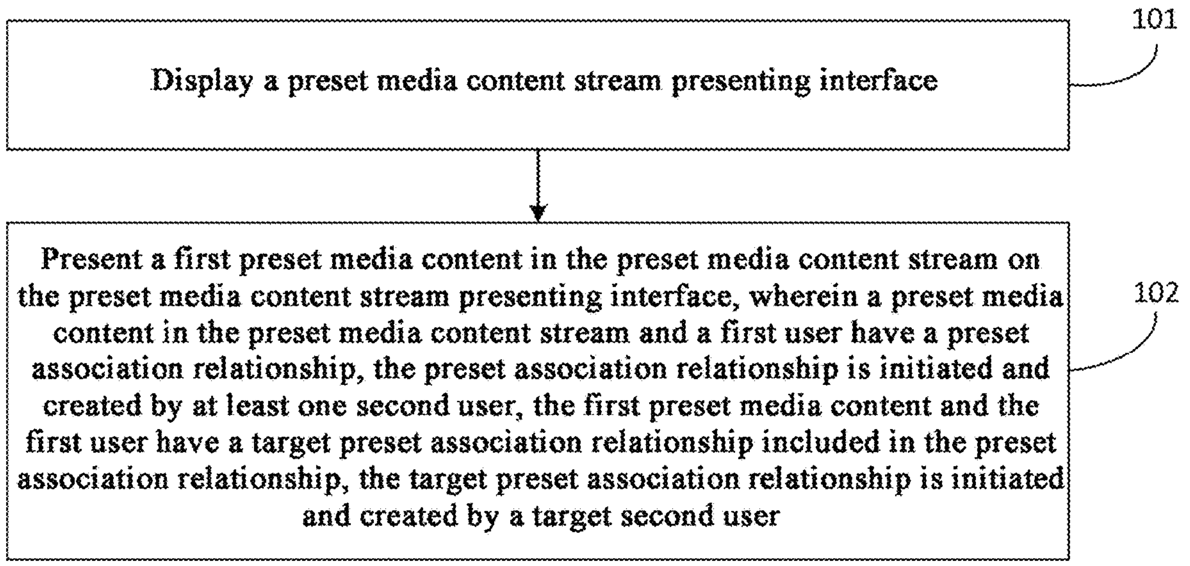
FIG. 1 is a flowchart of a content presentation method according to the embodiments of the present disclosure.

FIG. 1 is a flowchart of a content presentation method according to the embodiments of the present disclosure. The method can be performed by a content presentation apparatus. The apparatus can be implemented by software and/or hardware, and is usually integrated in an electronic device. The electronic device can be a mobile device, such as a mobile phone, a smart watch, a tablet, and a personal digital assistant, or can be another device, such as a desktop computer. As shown in FIG. 1, the method includes the following steps:

Step 101. A preset media content stream presentation interface is displayed.

In the embodiments of the present disclosure, the preset media content stream presentation interface can be an interface in a preset application program, and the preset application program can provide a media content presentation function and can be installed in an electronic device. Specific forms of media contents that can be presented by the preset application program can include text, image, audio, video, or the like. The media content can be provided by a server corresponding to the preset application program or posted by a user with the preset application program.

In the embodiments of the present disclosure, the preset media content stream presentation interface can be understood as an interface used for presenting preset media contents in a preset media content stream. An entry corresponding to the preset media content stream presentation interface can be configured in the preset application program. When it is detected that the entry is triggered, the preset media content stream presentation interface is displayed.

Step 102. A first preset media content in the preset media content stream is presented on the preset media content stream presentation interface, wherein a preset media content in the preset media content stream and the first user have a preset association relationship; the preset association relationship is initiated and created by at least one second user; the first preset media content and the first user have a target preset association relationship included in the preset association relationship; and the target preset association relationship is initiated and created by a target second user.

Exemplarily, in a process that a user views a media content in the preset application program, if there is a need to allow a target user to view a current media content, an association relationship between the current media content and the target user can be initiated. In the embodiments of the present disclosure, such an association relationship is referred to as a preset association relationship, and the current media content mentioned above can be referred to as a preset media content. The target user can include a contact of an initiator user of the preset association relationship in the preset application program.

Exemplarily, an initiation manner of the preset association relationship can be sharing, mentioning, or the like. Sharing can be understood as follows: The initiator user forwards a content to the target user. Mentioning can be understood as follows: The initiating user mentions the target user by entering a preset prompt (such as "@") when posting information about a content. Posting information can include posting comment information (for example, commenting on contents posted by others or oneself) or title information (for example, adding titles to contents posted by oneself). If there are at least two initiation manners, types of preset association relationships can also be distinguished according to the initiation manners. For example, the preset association relationship can include: The initiator user shares a corresponding content to the target user (which can be referred to as a sharing relationship), and the initiating user mentions the target user when posting information about a corresponding content (referred to as a mentioning relationship).

In the embodiments of the present disclosure, the first user can be understood as a user currently using the preset application program. For the first user, at least one second user (equivalent to the above initiator user) builds a preset association relationship with a preset media content by taking the first user as the above target user. That is, for the first user, at least one preset media content, and at least one preset media content constitutes a preset media content stream which is used for being presented on the preset media content stream presentation interface on the first user side, so as to achieve aggregated displaying of the preset media content in the form of a content stream. When a quantity of the second user is plural, different second users can initiate preset association relationships in the same or different ways.

In the embodiments of the present disclosure, the preset media content stream presentation interface can be an interface used for presenting preset media content streams corresponding to the same preset association relationship, or an interface used for presenting preset media content streams corresponding to at least two preset association relationships.

Exemplarily, the preset media content and the first user have a preset association relationship, including at least one of the following: the preset media content being shared by the second user to the first user; or the second user mentioning the first user when posting information on an associated interface (such as a commenting interface or a posting interface for preset media contents) of the preset media content. It can also be understood that the preset association relationship includes at least one of the following: the second user sharing a corresponding content to the first user (equivalent to the aforementioned sharing relationship); or the second user mentioning the first user when posting information about a corresponding content (equivalent to the aforementioned mentioning relationship). The preset media content stream presentation interface can be an interface used for presenting a preset media content stream corresponding to the sharing relationship, an interface used for presenting a preset media content stream corresponding to the mentioning relationship, and an interface used for presenting preset media content streams corresponding to both the sharing relationship and the mentioning relationship.

Exemplarily, the first preset media content can be understood as a preset media content currently presented on the preset media content stream presentation interface. The preset association relationship between the first preset media content and the first user is recorded as the target preset association relationship, and the target second user can be understood as a second user initiating the target preset association relationship.

As mentioned above, assuming that user A and user C can be understood as the second users in the embodiments of the present disclosure, and user B can be understood as the first user in the embodiments of the present disclosure. By adopting the scheme of the embodiments of the present disclosure, a shared content that needs to be viewed by user B is presented in the form of a content stream on the preset media content stream presentation interface. User B no longer needs to repeatedly perform switching between a content view interface and a conversation interface, which can effectively improve the content view efficiency.

According to the content presentation scheme provided in the embodiments of the present disclosure, a preset media content stream presentation interface is displayed; and a first preset media content in the preset media content stream is presented on the preset media content stream presentation interface, wherein a content in the preset media content stream and the first user have a preset association relationship; the preset association relationship is initiated and created by at least one second user; a target preset association relationship between the first preset media content and the first user have is initiated and created by a target second user. By the adoption of the above scheme, when there is a preset media content that has a preset association relationship, initiated by another user, with a current user, the preset media content can be presented in the form of a content stream on the preset media content stream presentation interface, facilitating the current user to continuously intensively view the preset media content and quickly make a reply, and improving the efficiency of viewing and replying to the preset media content.

In some embodiments, before a first preset media content in the preset media content stream is presented on the preset media content stream presentation interface, the method may further include: A to-be-presented first preset media content is determined from the preset media content stream on the basis of a preset presentation sequence. The preset presentation sequence is determined according to at least one of initiation time of the preset association relationship, an initiation manner of the preset association relationship, attribute information of the second user, or an interaction between the second user and the first user. The advantage of this setting is that a presentation sequence of a plurality of preset media contents can be reasonably determined.

Exemplarily, during the determination of the preset presentation sequence, preset media contents can be sequenced according to initiation time from early to late. Preset media contents closer to current time are presented preferentially, and preset media contents with corresponding initiation manners being the preset initiation manner can also be presented preferentially (such as presenting preset media contents with preset association relationships initiated in a mentioning manner. The attribute information of the second users can include contact group level information set by the first user. Preset media contents corresponding to second users with a higher group level can be presented preferentially. The interaction can include, for example, an interaction frequency. Preset media contents corresponding to second users with a higher interaction frequency with the first user.

In some embodiments, after a first preset media content in the preset media content stream is presented on the preset media content stream presentation interface, the method further includes: A second preset media content in the preset media content stream is presented on the preset media content stream presentation interface in response to a preset switching operation performed on the first preset media content. The advantage of this setting is that the first user is supported to switch the presentation of a preset media content by inputting the preset switching operation. Specific forms of the preset switching operation can be a sliding operation, a click operation, a double click operation, a long press operation, and the like.

Optionally, a second preset media content in the preset media content stream is presented on the preset media content stream presentation interface in response to a preset switching operation performed on the first preset media content may include: A to-be-presented second preset media content is determined, in response to the preset switching operation performed on the first preset media content, from the preset media content stream on the basis of a preset presentation sequence; and the second preset media content is presented on the preset media content stream presentation interface. The advantage of this setting is that after the preset switching operation is received and before a switched preset media content is presented, a to-be-presented preset media content can be determined according to a current latest preset presentation sequence.

In some embodiments, the preset media content stream includes preset media contents, and the preset media contents have not been subjected to a viewing operation by the first user. The advantage of this setting is that the current user can be facilitated to continuously intensively view unread preset media contents and improve the consumption efficiency of the unread preset media contents, thus facilitating the interaction efficiency between the first user and the second user. Optionally, in addition to presenting the preset media content stream on the preset media content stream presentation interface, it can also support viewing the preset media contents in other ways, such as jumping from a conversation interface with the second user to the content view interface to view the preset media contents. The fact that the first user has not viewed the preset media contents can be understood as that the first user has not viewed the preset media contents in the preset application program.

Optionally, after the first user has viewed the preset media contents, at least one of the sequence and display manner of the preset media contents in the preset media content stream is updated, wherein the display manner includes updating the preset media contents to be not displayed.

In some embodiments, the method can further include: At least one of the following is displayed on the preset media content stream presentation interface of the first preset media content: a user identifier of the target second user, or initiation manner information of the target preset association relationship. The advantage of this setting is that it can help the first user quickly learn about relevant information, such as an initiator user of the currently viewed preset media content through the preset media content stream presentation interface. The user identifier can include, for example, the name, nickname, or profile photo of a user. The initiation manner information can include, for example, image and text information related to an initiation manner, such as "Share It to You" or "@ You".

Exemplarily, a quantity of the target second user can be one or more. If there are a plurality of second users, the user identifiers of the plurality of target second users can be displayed simultaneously. If the initiation manner information corresponding to the plurality of target second users is consistent, one piece of initiation manner information can be displayed. If the initiation manner information corresponding to the plurality of target second users is inconsistent, a plurality of pieces of initiation manner information can be displayed. Each piece of initiation manner information can be displayed in association with the corresponding user identifier. When a single piece of initiation manner information corresponds to a plurality of user identifiers, the plurality of user identifiers can be displayed in an aggregated manner. For example, user a and user b share the first preset media content to the first user, and user c mentions the first user when commenting on the first preset media content. The identifier of user a and the identifier of user b, as well as "Share It to You" are displayed in an associated manner, and the identifier of user c and "@ You" are displayed in an associated manner.

In some embodiments, the method further includes: A preset associated interface corresponding to an initiation manner of the target preset association relationship is displayed in response to a triggering operation performed on associated display information of the target second user. Optionally, the associated display information includes the user identifier, and can further include the initiation manner information or the first information mentioned below. The advantage of this setting is that it facilitates the first user to easily enter the preset associated interface. Correspondence relationships (which can be referred to as preset correspondence relationships) between different initiation manners and preset associated interfaces can be preset. After it is detected that a user identifier has been triggered, a preset correspondence relationship is queried according to the initiation manner of the target preset association relationship and a corresponding associated interface is displayed. For example, if the initiation manner is sharing, a corresponding associated interface can be a conversation interface with the target second user. If the initiation manner is mentioning, a corresponding associated interface can be an interface where the target second user posts information about the first preset media content and mentions the first user. If the target second user mentions the first user when posting comment information on a commenting interface of the first preset media content, a corresponding associated interface can be the commenting interface of the first preset media content.

In some embodiments, a preset associated interface corresponding to an initiation manner of the target preset association relationship is displayed, which includes: A first preset associated interface used for displaying a display identifier of the first preset media content sent by the target second user is displayed, and a position of the display identifier can be navigated to on the first preset associated interface. The advantage of this setting is that the display identifier of the first preset media content can be navigated while entering the preset associated interface, facilitating the first user to perform an interaction operation on the display identifier, such as viewing relevant historical messages, performing quick reply, forwarding the display identifier, or the like. Optionally, a form of the display identifier can be related to the form of the first preset media content. For example, when the first preset media content is a video, the display identifier can be a video cover. Exemplarily, the initiation manner at this time can be sharing. The first preset associated interface can be a conversation interface with the target second user, and the position of the display identifier can be a position where a message sharing the first preset media content is displayed on the conversation interface.

In some embodiments, a preset associated interface corresponding to the initiation manner of the target preset association relationship is displayed, which may further include: A second preset associated interface used for initiating the target preset association relationship is displayed, and a position where the target second user initiates the target preset association relationship can be navigated to on the second preset associated interface. The advantage of this setting is that the operation position of the target second user can be navigated to while entering the preset associated interface, facilitating the first user to quickly view a specific situation or scenario when the target second user initiates the preset association relationship. For example, at this time, the initiation manner is mentioning, and the second preset associated interface can be a comment interface. The position where the target second user initiates the target preset association relationship can be a position where the target second user @ the first user during commenting. In this way, the first user can quickly view a content of historical comment information and subsequently posted new comment information when the target second user posts comment information and mentions the first user.

In some embodiments, the method further includes: First information input by the target second user when the target second user initiates the target preset association relationship and sent to the first user is displayed on the preset media content stream presentation interface of the first preset media content. The advantage of this setting is that it can help the first user quickly view, through the preset media content stream presentation interface, information that a second user intends to convey to the first user when the second user initiates a preset association relationship, which improves the information interaction efficiency. A display position of the first information can be a position associated with the display position of the user identifier of the second user, for example, below the user identifier or on the right hand side of the initiation manner information, or a position associated with the display position of the initiation manner information of the target preset association relationship, or another position.

In some embodiments, first information input by the target second user upon the target second user initiating the target preset association relationship and sent to the first user is displayed on the preset media content stream presentation interface of the first preset media content, which includes: A preset information view control is displayed on the preset media content stream presentation interface of the first preset media content in a case that a quantity of the target second user is plural; and the first information respectively input by the plurality of target second users upon the plurality of target second users initiating the target preset association relationship and sent to the first user is displayed in response to a triggering operation performed on the preset information view control. The advantage of this setting is that when a quantity of the first information is plural, the preset information view control can be first displayed on the preset media content stream presentation interface to prompt the user to view the first information, rather than directly displaying the first information, so as to avoid excessive obstruction on the first preset media content by the first information. When the first user intends to view the first information, the first user can easily view a plurality of pieces of first information by triggering the preset information view control. Optionally, each piece of first information can be displayed in association with the user identifier of the corresponding target second user.

In some embodiments, the method can further include: A preset reply control is displayed on the preset media content stream presentation interface of the first preset media content, wherein the preset reply control is configured to trigger a reply to the target second user. The advantage of this setting is that a quick reply to the target second user can be achieved on the preset media content stream presentation interface, without the need to switch the preset media content stream presentation interface to the conversation message interface or the commenting interface, so that the interaction efficiency between users is improved. A display form and display position of the preset reply control can be determined according to an actual situation. For example, the preset reply control can be a shortcut reply box located at a bottom of the preset media content stream presentation interface.

In some embodiments, it may also include: An information inputting interface is displayed in response to a triggering operation performed on the associated display information or the preset reply control; and second information input by the first user is received on the basis of the information inputting interface, and the target second user is replied to in a preset manner on the basis of the second information, wherein the preset manner corresponds to the initiation manner of the target preset association relationship. The advantage of this setting is that the second user is replied to in the preset manner corresponding to the initiation manner, making it easier for the target second user to view the second information replied by the first user at the corresponding position. In addition, the user identifier and other associated display information can be reused as controls configured to trigger a reply to the target second user, which enriches the triggering manner of a reply operation.

Exemplarily, if the initiation manner is sharing, the second information can be replied to the target second user in the form of a conversation message. For example, the second information can be displayed on the conversation interface with the target second user. If the initiation manner is mentioning, the second information can be replied to the target second user in the form of posting information. For example, the second information can be displayed on the commenting interface where the first user is mentioned. Optionally, after a successful reply to the second information has been detected, first prompt information can be displayed on the preset media content stream presentation interface to prompt the first user of the successful reply. The first preset media content can be kept being presented while the first prompt information is displayed. Optionally, when a display duration of the first prompt information reaches a first preset duration threshold, the displaying of the first prompt information is stopped to avoid long-term obstruction on the first preset media content.

In some embodiments, after the target second user is replied to in a preset manner on the basis of the second information, the method further includes: Third information sent and replied by the target second user in response to the second information; and second prompt information is displayed on the preset media content stream presentation interface of the first preset media content to prompt that there is a new reply message. Optionally, when it is detected that the second prompt information is triggered in a first preset triggering manner, the associated interface corresponding to the initiation manner of the target preset association relationship is displayed, and the third information is displayed on the associated interface. Optionally, when a display duration of the second prompt information reaches a second preset duration threshold, the displaying of the second prompt information is stopped to avoid long-term obstruction on the first preset media content.

In some embodiments, after the target second user is replied to in a preset manner on the basis of the second information, the method further includes: Third information sent and replied by the target second user in response to the second information; and the third information is displayed on the preset media content stream presentation interface of the first preset media content. The advantage of this setting is that information interaction between the first user and the target second user can be achieved on the preset media content stream presentation interface; an effect of chatting with someone while viewing the first preset media content can be achieved; and the user experience of content viewing and interaction can be improved.

In some embodiments, before a preset media content presentation interface is displayed, the method further includes: A user selection operation input by the first user is received; and the at least one second user is determined according to the user selection operation. The advantage of this setting is that a user can be supported to independently select a second user, so as to achieve user-dimensional filtering of preset media contents and then achieve targeted continuous and intensive viewing of the preset media contents.

For example, before the preset media content stream presentation interface is displayed, a contact list can be displayed. The user selection operation input by the first user is received on the basis of the contact list, and a contact selected by the first user is determined to be the second user. Correspondingly, after the second user is determined, the preset media content included in the preset media content stream and having the preset association relationship initiated by the second user for the first user can be determined.

In some embodiments, after a preset media content stream presentation interface is displayed, the method further includes: A user update operation input by the first user is received; and the at least one second user is updated according to the user update operation, and the preset media contents in the preset media content stream are adjusted according to the updated at least one second user. The advantage of this setting is that the first user is allowed to dynamically update the second user while viewing the preset media content, thereby updating the preset media contents included in the preset media content stream. Exemplarily, a preset update control (for example, "Hide His Posts" button) can be set. When a triggering operation performed on the preset update control has been detected, a second user corresponding to a currently presented preset media content is deleted. This means that the preset media content associated with the preset association relationship initiated by the second user is excluded from the preset media content stream. Exemplarily, a preset update operation is input according to a user identifier, such as a long press operation, to perform user update settings on a second user corresponding to the user identifier.

Figure 2:
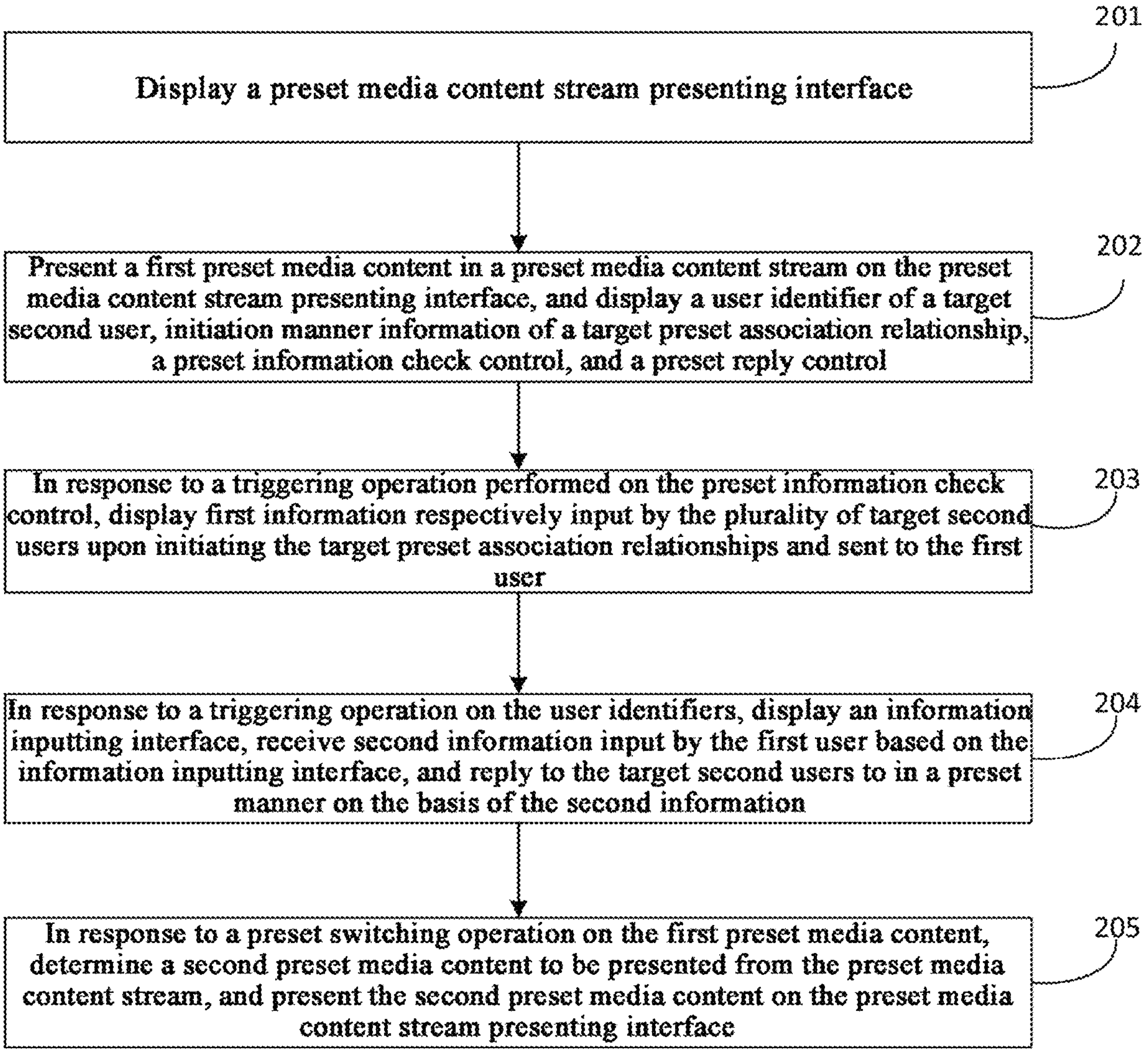
FIG. 2 is a flowchart of another content presentation method according to the embodiments of the present disclosure.

FIG. 2 is a flowchart of another content presentation method according to the embodiments of the present disclosure. This embodiment of the present disclosure is improved on the basis of the plurality of optional schemes in the above embodiment. Exemplarily, the method includes the following steps:

Step 201. A preset media content stream presentation interface is displayed.

Figure 3:
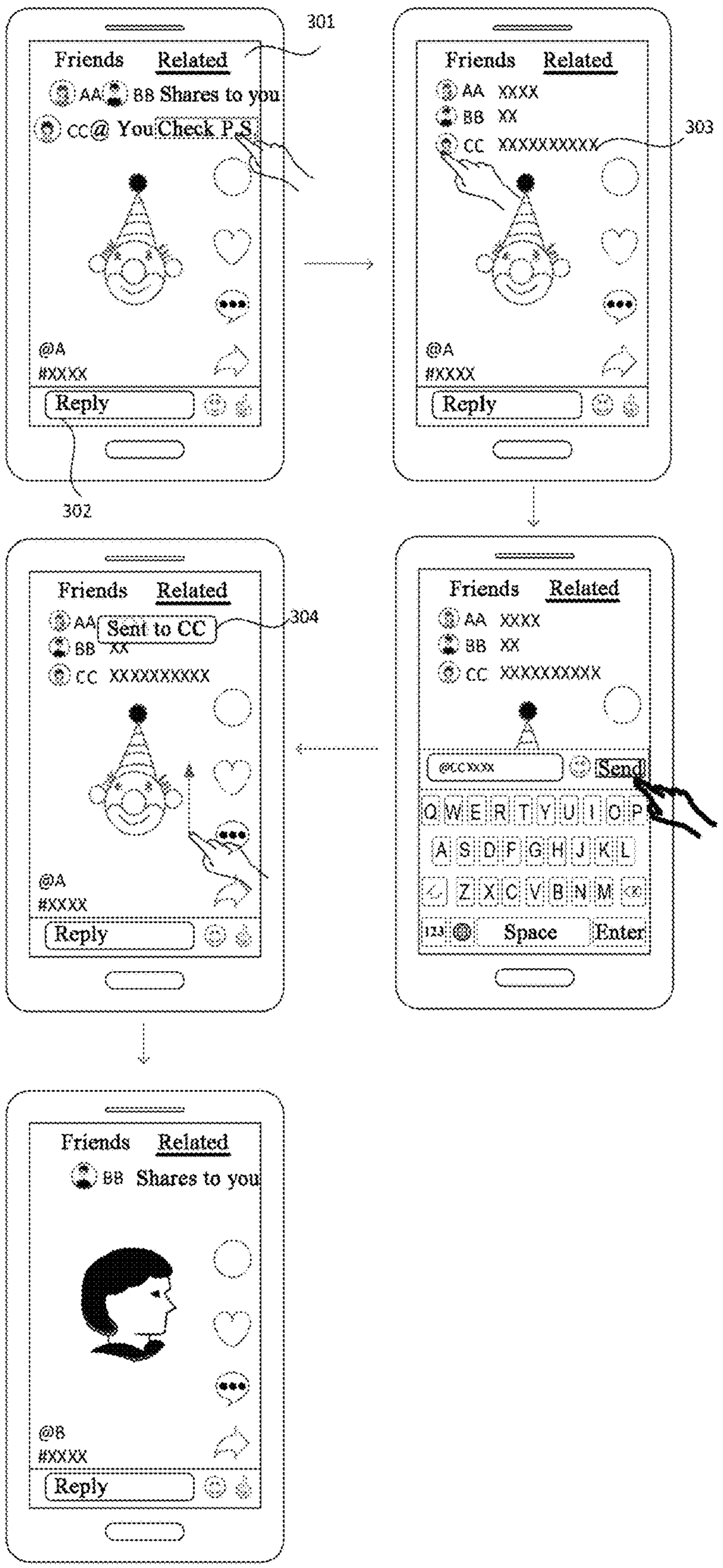
FIG. 3 is a schematic diagram of an interface interaction of a control display method according to the embodiments of the present disclosure.

FIG. 3 is a schematic diagram of an interface interaction of a control display method according to the embodiments of the present disclosure. As shown in FIG. 3, an entry for the preset media content stream display interface can be added to the preset application program, such as "Related to Me" identifier. When a user triggers the identifier, a preset media content stream presentation interface 301 can be displayed.

Step 202. A first preset media content in a preset media content stream is presented on the preset media content stream presentation interface, and a user identifier of a target second user, initiation manner information of a target preset association relationship, a preset information view control, and a preset reply control are displayed.

In this embodiment, preset media contents in the preset media content stream and the first user have preset association relationships, and the first user has not viewed the preset media contents in the preset media content stream. The preset association relationships are created by at least one second user. A target preset association relationship between the first preset media content and the first user is initiated and created by the target second user. The preset reply control is configured to trigger a reply to the target second user.

Exemplarily, the preset media contents can be videos. As shown in FIG. 3, the first preset media content is a clown video, and a quantity of the target second users is equal to three, namely, user AA, user BB, and user CC. When the first preset media content is played on the preset media content stream presentation interface, the user identifiers of the target second users are displayed, such as the profile photos and the user names in FIG. 3. The initiation manner information of the target preset association relationships is displayed, such as "Share it to You" and "@ You" in FIG. 3. The preset information view control is displayed, such as "View Postscript" button in FIG. 3. The preset reply control is displayed, such as a reply control 302 in FIG. 3.

As shown in FIG. 3, the three target second users correspond to inconsistent initiation manner information. Each piece of initiation manner information can be displayed in association with the corresponding user identifier. When a single piece of initiation manner information corresponds to a plurality of user identifiers, the plurality of user identifiers can be displayed in an aggregated manner. For example, the profile photo and name of user AA and the profile photo and name of user BB are displayed in association with the initiation manner information "Share It to You" of the initiation manner of sharing, while the profile photo and name of user CC are displayed in association with the initiation manner information "@ You" of the initiation manner of mentioning.

Step 203. First information respectively input by the plurality of target second users when the plurality of target second users initiate the target preset association relationships and sent to the first user is displayed in response to a triggering operation performed on the preset information view control.

Exemplarily, as shown in FIG. 3, after the first user clicks "View Postscript" button, first information 303 respectively input by the three target second users when the three target second users initiate the target preset association relationships and sent to the first user is displayed. The three pieces of first information 303 are respectively displayed in association with the user identifiers of the corresponding target second users.

Step 204. An information inputting interface is displayed in response to a triggering operation performed on the user identifiers; second information input by the first user is received on the basis of the information inputting interface; and the target second users are replied to in a preset manner on the basis of the second information.

In this embodiment, the preset manner corresponds to the initiation manners of the target preset association relationships.

Exemplarily, as shown in FIG. 3, when the first user clicks the profile photo of user CC, the information inputting interface can be displayed, such as an input panel in the figure, and the second information for user CC is input to an input box of the input panel. After the first user clicks a send button, the second information is sent to user CC in the preset manner. Assuming that user CC mentions the first user when commenting on the first preset media content, the second information can be sent as reply information of user CC to a corresponding commenting interface. After the second information is successfully sent, first prompt information can be displayed on the preset media content stream presentation interface, for example, "Sent to CC" 304 in FIG. 3.

Step 205. A to-be-presented second preset media content is determined, in response to a preset switching operation performed on the first preset media content, from the preset media content stream; and the second preset media content is presented on the preset media content stream presentation interface.

Exemplarily, as shown in FIG. 3, when the first user inputs an upward sliding operation performed on the first preset media content, the first preset media content can be switched to the second preset media content for presentation on the preset media content stream presentation interface. Assuming that the second preset media content corresponds to a single second user, for example, that the second preset media content is a preset media content shared by user BB to the first user, the user identifier of user BB, the information of the initiation manner of sharing, and the preset reply control can also be simultaneously displayed on the preset media content stream presentation interface. After the first user triggers the preset reply control, the information input by the first user can be sent to user BB as a private message. For example, the information input by the first user can be displayed on a conversation interface of user BB.

According to the content presentation method provided in the embodiments of the present disclosure, when there are unread preset media contents having preset association relationships, initiated by other users, with a current user, the unread preset media contents can be presented on the preset media content stream presentation interface in the form of a content stream, which facilitates the current user to continuously and intensively view the preset media contents, so as to improve the efficiency of viewing the unread preset media contents. When the preset media contents are presented, initiator users, initiation manners, and information input by the initiator users when the initiator users initiate the preset association relationships are also displayed in an associated manner, so that it is convenient for a user to quickly and comprehensively view related information of the preset media contents on the preset media content stream presentation interface. Furthermore, a quick information reply to the initiator users can be made on the preset media content stream presentation interface, so that the interaction efficiency between users is effectively improved.

Figure 4:
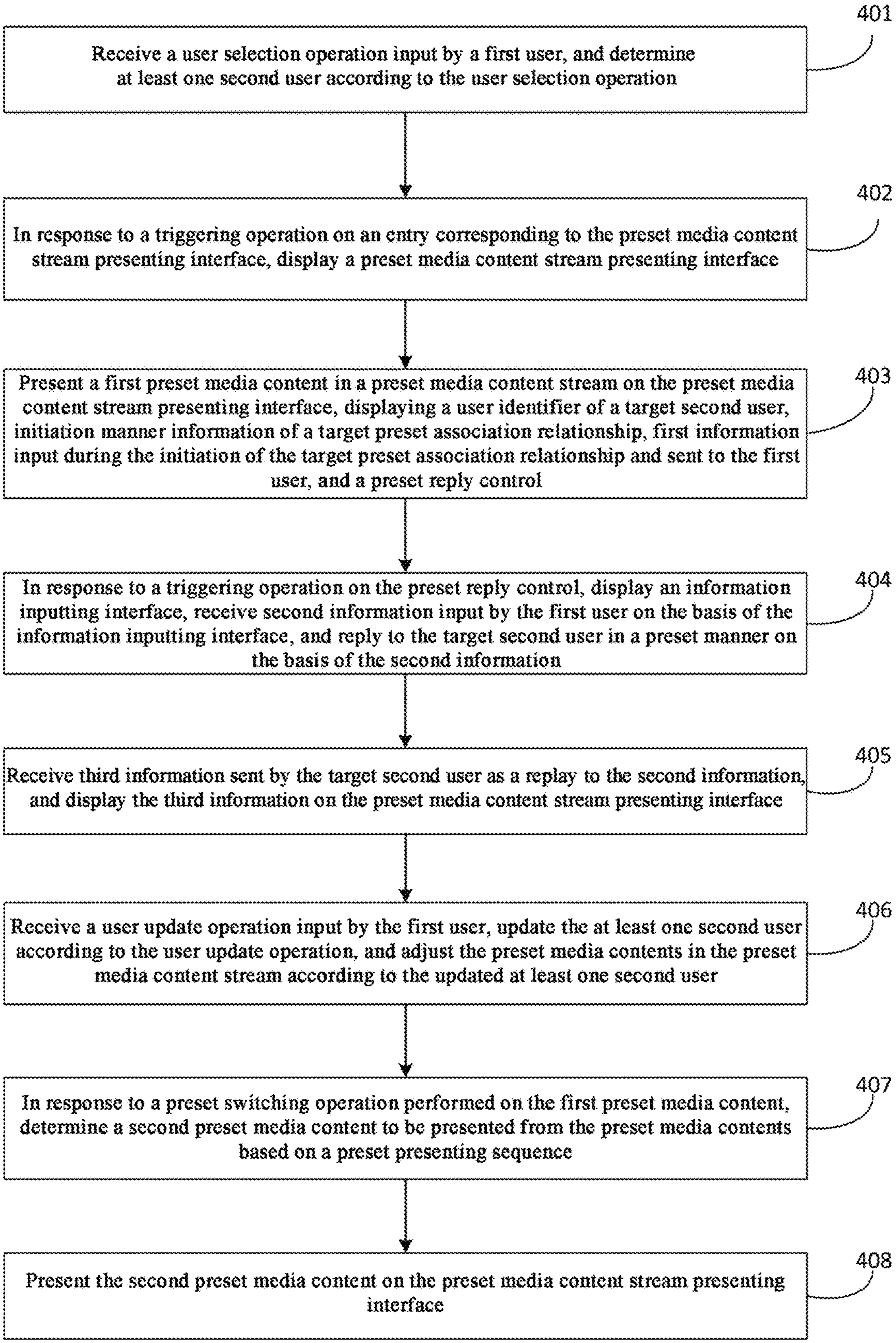
FIG. 4 is a flowchart of a further content presentation method according to the embodiments of the present disclosure.

FIG. 4 is a flowchart of another content presentation method according to the embodiments of the present disclosure. This embodiment of the present disclosure is improved on the basis of the plurality of optional schemes in the above embodiment. As shown in FIG. 4, the method can include:

Step 401. A user selection operation input by the first user is received, and at least one second user is determined according to the user selection operation.

Exemplarily, before a preset media content stream presentation interface is displayed, the first user can independently select a second user. For example, when the first user has a large quantity of unread preset media contents, a contact list can be triggered to be displayed. The contact list can display initiator users of preset association relationships corresponding to the unread preset media contents. The first user can view friends the first user is interested in, and then view the preset media contents shared or mentioned by these friends on the preset media content stream presentation interface.

Step 402. A preset media content stream presentation interface is displayed in response to a triggering operation performed on an entry corresponding to the preset media content stream presentation interface.

Step 403. A first preset media content in a preset media content stream is presented on the preset media content stream presentation interface, and a user identifier of a target second user, initiation manner information of a target preset association relationship, first information input during the initiation of the target preset association relationship and sent to the first user, and a preset reply control are displayed.

Figure 5:
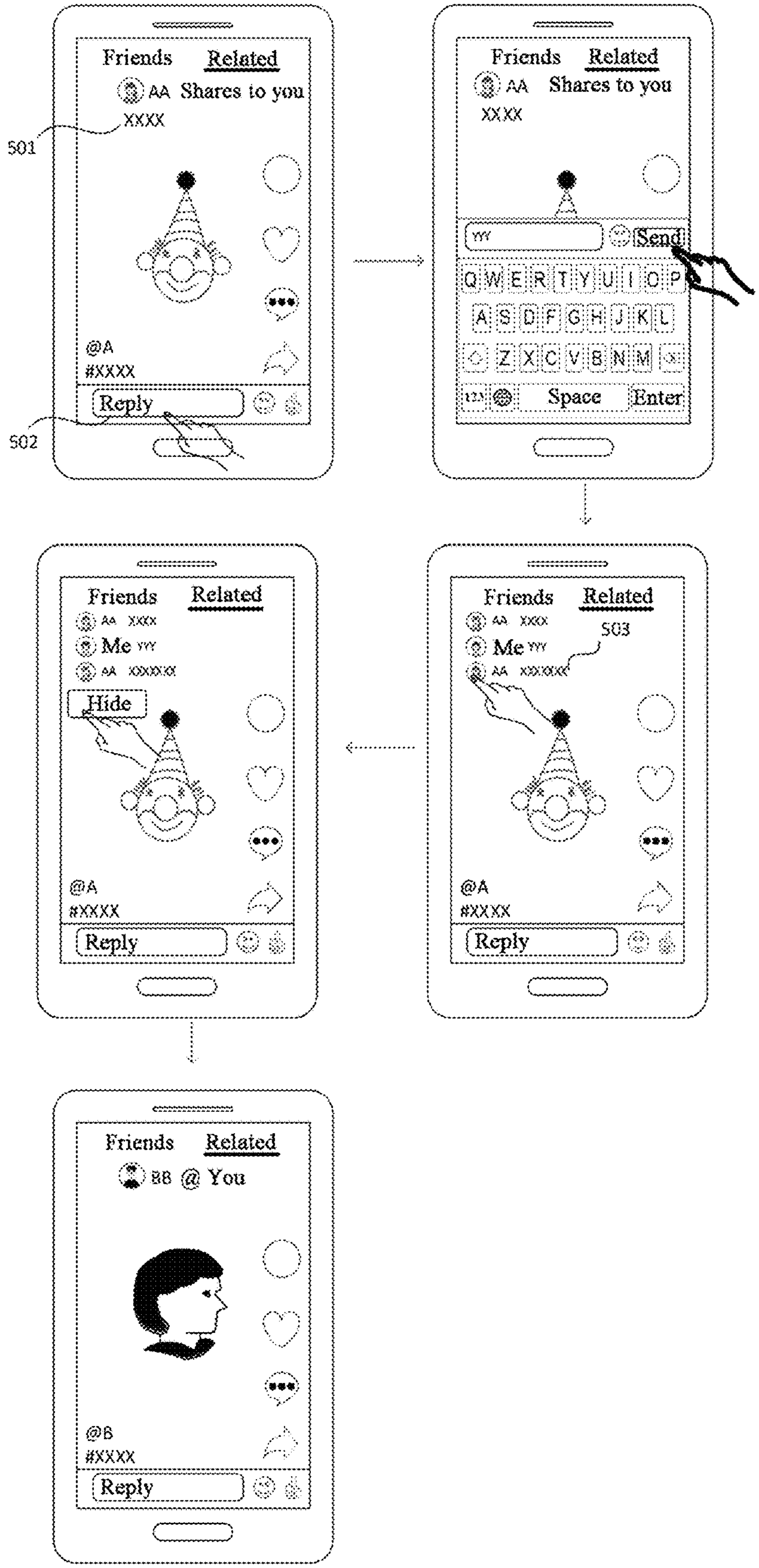
FIG. 5 is a flowchart of an interface interaction of another content presentation method according to the embodiments of the present disclosure.

FIG. 5 is a flowchart of an interface interaction of another content presentation method according to the embodiments of the present disclosure. As shown in FIG. 5, a first preset media content is a clown video, and a target second user is user AA. When the clown video is played, a user identifier of user AA is displayed, such as the profile photo and the user name in the figure, and initiation manner information of a target preset association relationship is displayed. A note input when user AA shares the clown video to the first user and pointing to the first user is displayed below the user identifier of user AA in an associated manner, that is, first information 501. A preset reply control 502 is displayed at a bottom of a preset media content stream presentation interface.

Step 404. An information inputting interface is displayed in response to a triggering operation performed on the preset reply control; second information input by the first user is received on the basis of the information inputting interface; and the target second user is replied to in a preset manner on the basis of the second information.

As shown in FIG. 5, when the first user triggers the preset reply control 502, an input panel can be displayed to receive the second information input by the first user, and the second information is replied to user AA as reply information. Optionally, the second information can also be displayed on the preset media content stream presentation interface.

Step 405. Third information sent by the target second user in response to the second information is received, and the third information is displayed on the preset media content stream presentation interface.

Exemplarily, if the second information is delivered to user AA, user AA can continue to reply to the second information. In this case, the third information replied by user AA can be displayed on the preset media content stream presentation interface, such as third information 503 in FIG. 5.

Step 406. A user update operation input by the first user is received; and the at least one second user is updated according to the user update operation, and the preset media contents in the preset media content stream are adjusted according to the updated at least one second user.

Exemplarily, the user update operation can include a preset update operation performed on the user identifiers of the second users, such as a long press operation. As shown in FIG. 5, when the first user performs a long press operation on the profile photo of user AA, "Hide His Posts" button can be displayed. After the first user clicks this button, user AA will be deleted from the at least one second user, so that preset media contents in a preset association relationship initiated by user AA will not be included in the preset media content stream.

Optionally, as shown in FIG. 5, the preset media contents in the preset media content stream are adjusted according to the at least one updated second user, which can include: Automatic switching is performed on the preset media content stream presentation interface to present a new preset media content.

Step 407. A to-be-presented second preset media content is determined from the preset media contents on the basis of a preset presentation sequence in response to a preset switching operation performed on the first preset media content.

In this embodiment, the sequence of the preset media contents in the preset media content stream can be comprehensively determined according to initiation time of the preset association relationships, initiation manners of the preset association relationships, attribute information of the second users, and interactions between the second users and the first user, and a first ranked preset media content can be determined as the second preset media content.

Step 408. The second preset media content is presented on the preset media content stream presentation interface.

According to the content presentation method provided in the embodiments of the present disclosure, when there are preset media contents having preset association relationships, initiated by other users, with a current user, the current user can be supported to filter initiator users, and to-be-presented preset media contents included in a preset media content stream are determined according to initiator users obtained after filtering; the preset media contents are presented in the form of a content stream after a preset media content stream presentation interface is displayed, which facilitates the current user to continuously and intensively view the preset media contents, so as to improve the efficiency of viewing the unread preset media contents. When the preset media contents are presented, initiator users, initiation manners, and information input by the initiator users when the initiator users initiate the preset association relationships are also displayed in an associated manner, so that it is convenient for a user to quickly and comprehensively view related information of the preset media contents on the preset media content stream presentation interface. Furthermore, in the process of viewing the preset media contents, the first user can also update initiator users corresponding to preset media contents that the first user intends to view later, so that the preset media content stream is dynamically adjusted, and it is more flexible to view the preset media contents.

Figure 6:
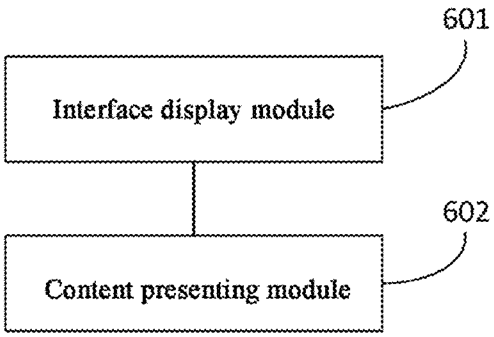
FIG. 6 is a structural block diagram of a content presentation apparatus according to the embodiments of the present disclosure.

FIG. 6 is a structural block diagram of a content presentation apparatus according to the embodiments of the present disclosure. The apparatus can be implemented by software and/or hardware, can be usually integrated in an electronic device, and can achieve content presentation by performing a content presentation method. As shown in FIG. 6, the apparatus includes:

an interface display module 601, configured to display a preset media content stream presentation interface; and a content presentation module 602, configured to present a first preset media content in the preset media content stream on the preset media content stream presentation interface, wherein a preset media content in the preset media content stream and the first user have a preset association relationship; the preset association relationship is initiated and created by at least one second user; the first preset media content and the first user have a target preset association relationship included in the preset association relationship; and the target preset association relationship is initiated and created by a target second user.

According to the content presentation apparatus provided in the embodiments of the present disclosure, a preset media content stream presentation interface is displayed; and a first preset media content in the preset media content stream is presented on the preset media content stream presentation interface, wherein a content in the preset media content stream and the first user have a preset association relationship; the preset association relationship is initiated and created by at least one second user; a target preset association relationship between the first preset media content and the first user have is initiated and created by a target second user. By the adoption of the above apparatus, when there is a preset media content that has a preset association relationship, initiated by another user, with a current user, the preset media content can be presented in the form of a content stream on the preset media content stream presentation interface, facilitating the current user to continuously intensively view the preset media content and quickly make a reply, and improving the efficiency of viewing and replying to the preset media content.

Optionally, the preset media content and the first user have a preset association relationship, including at least one of the following: the preset media content being shared by the second user to the first user; or the second user mentions the first user when posting information on an associated interface of the preset media content.

Optionally, the preset media content stream includes preset media contents, and the preset media contents have not been subjected to a viewing operation by the first user.

Optionally, the apparatus further includes: a first display module, configured to display at least one of the following on the preset media content stream presentation interface of the first preset media content: a user identifier of the target second user, or initiation manner information of the target preset association relationship.

Optionally, the apparatus further includes: an associated interface entering module, configured to enter, in response to a triggering operation performed on associated display information of the target second user, a preset associated interface corresponding to an initiation manner of the target preset association relationship.

Optionally, the associated display information includes the user identifier.

Optionally, the action of entering a preset associated interface corresponding to an initiation manner of the target preset association relationship includes at least one of the following: entering a first preset associated interface used for displaying a display identifier of the first preset media content sent by the target second user, or navigating to a position of the display identifier on the first preset associated interface; and entering a second preset associated interface used for initiating the target preset association relationship, and navigating, on the second preset associated interface, to a position where the target second user initiates the target preset association relationship.

Optionally, the apparatus further includes: a second display module, configured to display, on the preset media content stream presentation interface of the first preset media content, first information input by the target second user when the target second user initiates the target preset association relationship and sent to the first user.

Optionally, the second display module includes:

a view control display unit, configured to display a preset information view control on the preset media content stream presentation interface of the first preset media content in a case that a quantity of the target second user is plural; and a display unit, configured to display, in response to a triggering operation performed on the preset information view control, the first information respectively input by the plurality of target second users when the plurality of target second users initiate the target preset association relationships and sent to the first user.

Optionally, the apparatus further includes:

a reply control display module, configured to display a preset reply control on the preset media content stream presentation interface of the first preset media content, wherein the preset reply control is configured to trigger a reply to the target second user.

Optionally, the apparatus further includes:

an inputting interface display module, configured to display an information inputting interface in response to a triggering operation performed on the associated display information or the preset reply control; and an information reply module, configured to: receive, on the basis of the information inputting interface, second information input by the first user, and reply to the target second user in a preset manner on the basis of the second information, wherein the preset manner corresponds to the initiation manner of the target preset association relationship.

Optionally, the apparatus further includes:

an information receiving module, configured to receive, after the target second user is replied to in the preset manner on the basis of the second information, third information sent and replied by the target second user in response to the second information; and a third display module, configured to display the third information on the preset media content stream presentation interface of the first preset media content.

Optionally, the apparatus further includes:

a content switching module, configured to: present, after a first preset media content in the preset media content stream is presented on the preset media content stream presentation interface, a second preset media content in the preset media content stream on the preset media content stream presentation interface in response to a preset switching operation performed on the first preset media content.

Optionally, the content switching module performs the action of presenting a second preset media content in the preset media content stream on the preset media content stream presentation interface, which includes:

determining a to-be-presented second preset media content from the preset media content stream on the basis of a preset presentation sequence, wherein the preset presentation sequence is determined according to at least one of initiation time of the preset association relationship, an initiation manner of the preset association relationship, attribute information of the second user, or an interaction between the second user and the first user; and presenting the second preset media content on the preset media content stream presentation interface.

Optionally, the apparatus further includes:

a user selection operation receiving module, configured to: receive, before a preset media content presentation interface is displayed, a user selection operation input by the first user; and determine the at least one second user according to the user selection operation.

Optionally, the apparatus further includes:

a user update operation receiving module, configured to receive, after a preset media content presentation interface is displayed, a user update operation input by the first user; and an update module, configured to: update the at least one second user according to the user update operation, and adjust the preset media contents in the preset media content stream according to the updated at least one second user.

Figure 7:
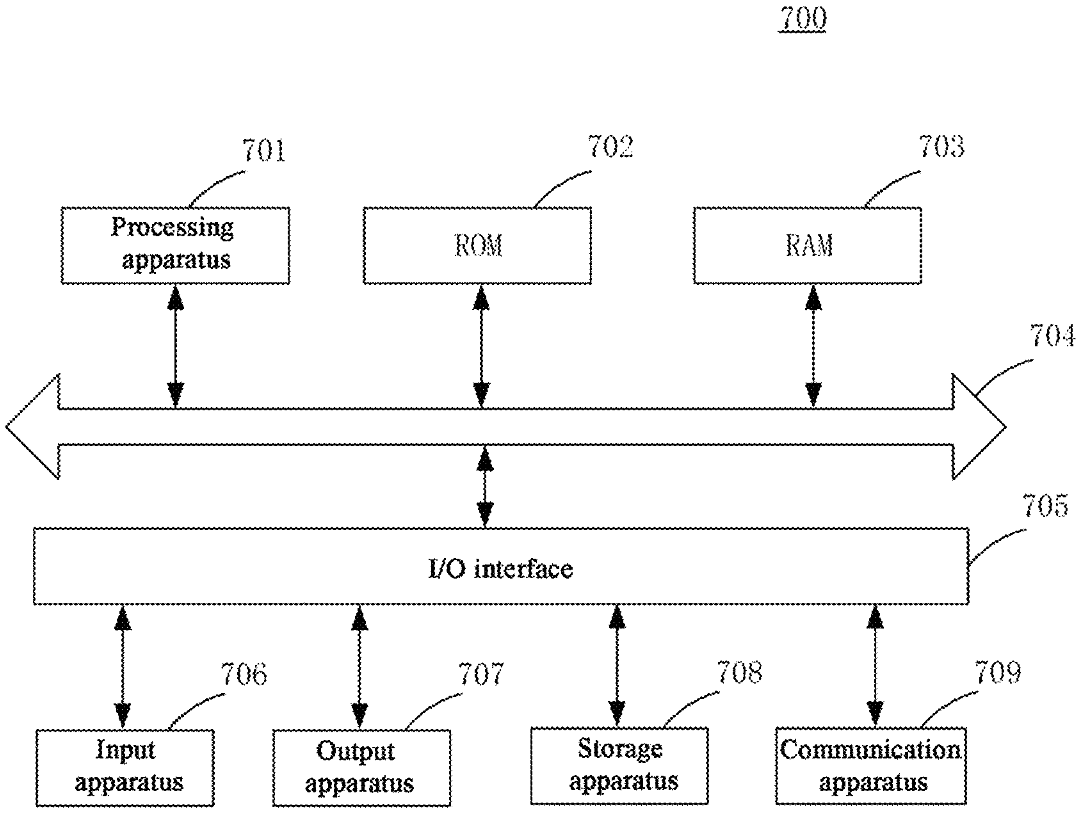
FIG. 7 is a structural block diagram of an electronic device according to the embodiments of the present disclosure.

Reference is now made to FIG. 7 below, which illustrates a schematic structural diagram of an electronic device 700 suitable for implementing the embodiments of the present disclosure. The electronic device in the embodiments of the present disclosure may include, for example, a mobile phone, a laptop, a digital broadcast receiver, a Personal Digital Assistant (PDA), a Portable Android Device (PAD), a Portable Media Player (PMP), a mobile terminal such as a vehicle-mounted terminal (for example, a vehicle-mounted navigation terminal), and a fixed terminal such as digital television (TV) and a desktop computer. The electronic device shown in FIG. 7 is only an example.

As shown in FIG. 7, the electronic device 700 may include a processing apparatus (such as a central processing unit and graphics processor) 701. The electronic device 700 can perform various appropriate actions and processing according to programs stored in a Read-Only Memory (ROM) 702 or loaded from a storage apparatus 708 to a Random Access Memory (RAM) 703. Various programs and data required for operations of the electronic device 700 may also be stored in the RAM 703. The processing apparatus 701, the ROM 702, and the RAM 703 are connected to each other through a bus 704. An Input/Output (I/O) interface 705 is also connected to a bus 704.

Usually, following apparatuses can be connected to the I/O interface 705: an input apparatus 706 including a touch screen, a touchpad, a keyboard, a mouse, a camera, a microphone, an accelerometer, a gyroscope, and the like; an output apparatus 707 including a Liquid Crystal Display (LCD), a speaker, a vibrator, and the like; a storage apparatus 708 including a magnetic tape, a hard disk drive, and the like; and a communication apparatus 709. The communication apparatus 709 can allow the electronic device 700 to wirelessly or wiredly communicate with other devices to exchange data. Although FIG. 7 shows the electronic device 700 with multiple apparatuses, it should be understood that the electronic device 700 is not required to implement or have all the apparatuses shown, and can alternatively implement or have more or fewer apparatuses.

Particularly, according to the embodiments of the present disclosure, the process described in the reference flowchart above can be implemented as a computer software program. For example, the embodiments of the present disclosure include a computer program product. The computer program product includes a computer program carried on a non-transitory computer-readable medium, and the computer program includes program codes used for performing the methods shown in the flowcharts. In such an embodiment, the computer program may be downloaded and installed from a network through the communication apparatus 709, or installed from the storage apparatus 708, or installed from the ROM 702. When the computer program is executed by the processing apparatus 701, the above-mentioned functions in the methods of the embodiments of the present disclosure are executed.

It should be noted that the computer-readable medium mentioned in the present disclosure can be a computer-readable signal medium, a computer-readable storage medium, or any combination of the computer-readable signal medium and the computer-readable storage medium. The computer-readable storage medium can be, for example, electric, magnetic, optical, electromagnetic, infrared, or semiconductor systems, apparatuses, or devices, or any combination of the above. The computer-readable storage medium may include: an electrical connection with one or more wires, a portable computer disk, a hard disk drive, a RAM, a ROM, an Erasable Programmable Read Only Memory (EPROM) or flash memory, an optical fiber, a Compact Disc Read-Only Memory (CD-ROM), an optical storage device, a magnetic storage device, or any suitable combination of the above. In the present disclosure, the computer-readable storage medium may be any tangible medium that contains or stores a program, and the program can be used by or in combination with an instruction execution system, apparatus, or device. In the present disclosure, the computer-readable signal media may include data signals propagated in a baseband or as part of a carrier wave, which carries computer-readable program codes. The propagated data signals can be in various forms, including: electromagnetic signals, optical signals, or any suitable combination of the above. The computer-readable signal medium may also be any computer-readable medium other than a computer-readable storage medium. The computer-readable signal medium can send, propagate, or transmit programs for use by or in combination with an instruction execution system, apparatus, or device. The program codes contained in the computer-readable medium can be transmitted using any suitable medium, including: a wire, an optical cable, a Radio Frequency (RF), and the like, or any suitable combination of the above.

The computer-readable medium may be included in the electronic device or exist alone and is not assembled into the electronic device.

The above computer-readable medium carries one or more programs. When the one or more programs are executed by the electronic device, the electronic device is caused to: display a preset media content stream presentation interface; and present a first preset media content in the preset media content stream on the preset media content stream presentation interface, wherein a preset media content in the preset media content stream and the first user have a preset association relationship; the preset association relationship is initiated and created by at least one second user; the first preset media content and the first user have a target preset association relationship included in the preset association relationship; and the target preset association relationship is initiated and created by a target second user.

Computer program codes for performing the operations of the present disclosure may be written in one or more programming languages or a combination thereof. The above programming languages include but are not limited to an object-oriented programming language such as Java, Smalltalk, and C++, and conventional procedural programming languages such as "C" language or similar programming languages. The program codes may be executed entirely on a user computer, partly on a user computer, as a stand-alone software package, partly on a user computer and partly on a remote computer, or entirely on a remote computer or a server. In a case that a remote computer is involved, the remote computer can be connected to a user computer through any kind of networks, including a LAN or a WAN, or can be connected to an external computer (for example, through an Internet using an Internet service provider).

The flowcharts and block diagrams in the accompanying drawings illustrate possible system architectures, functions, and operations that may be implemented by a system, a method, and a computer program product according to various embodiments of the present disclosure. In this regard, each block in a flowchart or a block diagram may represent a module, a program, or a part of a code. The module, the program, or the part of the code includes one or more executable instructions used for implementing specified logic functions. In some implementations used as substitutes, functions annotated in blocks may alternatively occur in a sequence different from that annotated in an accompanying drawing. For example, actually two blocks shown in succession may be performed basically in parallel, and sometimes the two blocks may be performed in a reverse sequence. This is determined by a related function. It is also be noted that, Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

The modules described in the embodiments of the present disclosure can be implemented through software or hardware. The name of the module do not constitute a limitation on the module itself. For example, an interface display module can also be described as "a module that displays a preset media content stream presentation module".

The functions described herein above may be performed, at least in part, by one or a plurality of hardware logic components. For example, example hardware logic components that can be used include: a Field Programmable Gate Array (FPGA), an Application Specific Integrated Circuit (ASIC), Application Specific Standard Parts (ASSP), a System on Chip (SOC), a Complex Programmable Logic Device (CPLD), and the like.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. The machine-readable storage medium may include an electrical connection based on one or more wires, a portable computer disk, a hard disk drive, a RAM, a ROM, an EPROM or flash memory, an optical fiber, a CD-ROM, an optical storage device, a magnetic storage device, or any suitable combinations of the above contents.

According to one or more embodiments of the present disclosure, a content presentation method is provided, which is applied at the first user side and includes:

displaying a preset media content stream presentation interface for presenting a preset media content stream; and presenting a first preset media content in the preset media content stream on the preset media content stream presentation interface, wherein a preset media content in the preset media content stream and the first user have a preset association relationship; the preset association relationship is initiated and created by at least one second user; the first preset media content and the first user have a target preset association relationship included in the preset association relationship; and the target preset association relationship is initiated and created by a target second user.

Optionally, the preset media content and the first user have the preset association relationship, which includes at least one of the following:

the preset media content being shared by the second user to the first user; or the second user mentioning the first user when posting information on an associated interface of the preset media content.

Optionally, the preset media content stream includes at least one preset media content, and the preset media content has not been viewed by the first user.

Optionally, the method further includes:

displaying at least one of the following on the preset media content stream presentation interface of the first preset media content: a user identifier of the target second user, or initiation manner information of the target preset association relationship.

Optionally, the method further includes:

entering, in response to a triggering operation performed on associated display information of the target second user, a preset associated interface corresponding to an initiation manner of the target preset association relationship.

Optionally, the associated display information includes the user identifier.

Optionally, the entering a preset associated interface corresponding to an initiation manner of the target preset association relationship includes at least one of the following:

entering a first preset associated interface used for displaying a display identifier of the first preset media content sent by the target second user, and navigating to a position of the display identifier on the first preset associated interface; or entering a second preset associated interface used for initiating the target preset association relationship, and navigating, on the second preset associated interface, to a position where the target second user initiates the target preset association relationship.

Optionally, the method further includes:

displaying, on the preset media content stream presentation interface of the first preset media content, first information input by the target second user when the target second user initiates the target preset association relationship and sent to the first user.

Optionally, the displaying, on the preset media content stream presentation interface of the first preset media content, first information input by the target second user when the target second user initiates the target preset association relationship and sent to the first user includes:

displaying a preset information view control on the preset media content stream presentation interface of the first preset media content in a case that a quantity of the target second user is plural; and displaying, in response to a triggering operation performed on the preset information view control, the first information respectively input by the plurality of target second users when the plurality of target second users initiate the target preset association relationships and sent to the first user.

Optionally, the method further includes:

displaying a preset reply control on the preset media content stream presentation interface of the first preset media content, wherein the preset reply control is configured to trigger a reply to the target second user.

Optionally, the method further includes:

displaying an information inputting interface in response to a triggering operation performed on the associated display information or the preset reply control; and receiving, on the basis of the information inputting interface, second information input by the first user, and replying to the target second user in a preset manner on the basis of the second information, wherein the preset manner corresponds to the initiation manner of the target preset association relationship.

Optionally, after the replying to the target second user in a preset manner on the basis of the second information, the method further includes:

receiving third information sent and replied by the target second user in response to the second information; and displaying the third information on the preset media content stream presentation interface of the first preset media content.

Optionally, after the presenting a first preset media content in the preset media content stream on the preset media content stream presentation interface, the method further includes:

presenting a second preset media content in the preset media content stream on the preset media content stream presentation interface in response to a preset switching operation performed on the first preset media content.

Optionally, the presenting a second preset media content in the preset media content stream on the preset media content stream presentation interface includes:

determining a to-be-presented second preset media content from the preset media content stream on the basis of a preset presentation sequence, wherein the preset presentation sequence is determined according to at least one of initiation time of the preset association relationship, an initiation manner of the preset association relationship, attribute information of the second user, or an interaction between the second user and the first user; and presenting the second preset media content on the preset media content stream presentation interface.

Optionally, before the displaying a preset media content presentation interface, the method further includes:

receiving a user selection operation input by the first user; and determining the at least one second user according to the user selection operation.

Optionally, after the displaying a preset media content stream presentation interface, the method further includes:

receiving a user update operation input by the first user; and updating the at least one second user according to the user update operation, and adjusting the preset media contents in the preset media content stream according to the updated at least one second user.

According to one or more embodiments of the present disclosure, a content presentation apparatus is provided, which is configured on the first user side and includes:

an interface display module, configured to display a preset media content stream presentation interface; and a content presentation module, configured to present a first preset media content in the preset media content stream on the preset media content stream presentation interface, wherein a preset media content in the preset media content stream and the first user have a preset association relationship; the preset association relationship is initiated and created by at least one second user; the first preset media content and the first user have a target preset association relationship included in the preset association relationship; and the target preset association relationship is initiated and created by a target second user.

The invention claimed is:

1. A content presentation method, applied at a first user side and comprising:

displaying a media content stream presentation interface for presenting a media content stream comprising a first media content and a second media content that have not been viewed by a first user, and the first media content and the second media content are posted by different users;

presenting the first media content in the media content stream on the media content stream presentation interface, wherein the first media content and the first user have an association relationship initiated based on a second user performing an interaction operation on the first user, an initiation manner of the association relationship comprises at least one of the following: the first media content being shared by the second user to the first user via an instant messaging session; or the second user mentioning the first user by entering a prompt symbol during posting information about the first media content on an associated interface of the first media content;

presenting at least one of the following on the media content stream presentation interface of the first media content: a user identifier of the second user, or interaction information generated based on the interaction operation;

in response to a switching operation on the first media content, presenting the second media content on the media content stream presentation interface;

displaying a reply control on the media content stream presentation interface of the first media content;

in response to a triggering operation on the reply control, displaying an information inputting interface; and replying, based on the information inputting interface receiving second information of the first user and based on the second information, to the second user in a reply manner corresponding to the initiation manner of the association relationship.

2. The method according to claim 1, further comprising:

in response to a triggering operation applied on associated display information of the second user, entering the associated interface corresponding to the initiation manner of the association relationship.

3. The method according to claim 2, wherein the associated display information comprises the user identifier.

4. The method according to claim 2, wherein entering the associated interface corresponding to the initiation manner of the association relationship comprises at least one of the following:

entering a first associated interface for displaying a display identifier of the first media content sent by the second user, and navigating to a position of the display identifier on the first associated interface;

entering a second associated interface for initiating the association relationship, and navigating, on the second associated interface, to a position where the second user operates upon initiating the association relationship.

5. The method according to claim 2, further comprising:

in response to the triggering operation on the associated display information, displaying the information inputting interface;

replying, based on the information inputting interface receiving the second information of the first user and based on the second information, to the second user in the reply manner.

6. The method according to claim 5, wherein after replying to the second user in the reply manner based on the second information, the method further comprises:

receiving third information sent by the second user as replying to the second information;

displaying the third information on the media content stream presentation interface of the first media content.

7. The method according to claim 1, further comprising:

displaying, on the media content stream presentation interface of the first media content, first information input by the second user upon initiating the association relationship and sent to the first user.

8. The method according to claim 7, wherein the displaying, on the media content stream presentation interface of the first media content, first information input by the second user upon initiating the association relationship and sent to the first user comprises:

displaying an information view control on the media content stream presentation interface of the first media content in a case that a quantity of the second user is plural;

in response to a triggering operation on the information view control, displaying the first information respectively input by the second user upon initiating association relationships and sent to the first user.

9. The method according to claim 1, wherein the reply control is configured to trigger a reply to the second user.

10. The method according to claim 1, wherein the presenting the second media content in the media content stream on the media content stream presentation interface comprises:

determining the second media content to be presented from the media content stream based on a presentation sequence, wherein the presentation sequence is determined according to at least one of initiation time of the association relationship, the initiation manner of the association relationship, attribute information of the second user, or an interaction status between the second user and the first user;

presenting the second media content on the media content stream presentation interface.

11. The method according to claim 1, wherein before the displaying the media content stream presentation interface, the method further comprises:

receiving a user selection operation input by the first user;

determining at least one second user according to the user selection operation.

12. The method according to claim 1, wherein after the displaying the media content stream presentation interface, the method further comprises:

receiving a user update operation input by the first user;

updating at least one second user according to the user update operation, and adjusting the media contents in the media content stream according to the updated at least one second user.

13. An electronic device, comprising a memory, a processor, and a computer program stored on the memory and runnable on the processor, wherein the processor, when executing the computer program, implements:

displaying a media content stream presenting interface for presenting a media content stream comprising a first media content and a second media content that have not been viewed by a first user, and the first media content and the second media content are posted by different users;

presenting the first media content in the media content stream on the media content stream presenting interface, wherein the first media content and the first user have an association relationship initiated based on a second user performing an interaction operation on the first user, an initiation manner of the association relationship comprises at least one of the following: the first media content being shared by the second user to the first user via an instant messaging session; or the second user mentioning the first user by entering a prompt symbol during posting information about the first media content on an associated interface of the first media content;

presenting at least one of the following on the media content stream presenting interface of the first media content: a user identifier of the second user, or interaction information generated based on the interaction operation;

in response to a switching operation on the first media content, presenting the second media content on the media content stream presenting interface;

displaying a reply control on the media content stream presenting interface of the first media content;

in response to a triggering operation on the reply control, displaying an information inputting interface; and replying, based on the information inputting interface receiving second information of the first user and based on the second information, to the second user in a reply manner corresponding to the initiation manner of the association relationship.

14. A non-transitory computer-readable storage medium, wherein the computer-readable storage medium stores a computer program, and the computer program, when executed by a processor, implements:

displaying a media content stream presenting interface for presenting a media content stream comprising a first media content and a second media content that have not been viewed by a first user, and the first media content and the second media content are posted by different users;

presenting the first media content in the media content stream on the media content stream presenting interface, wherein the first media content and the first user have an association relationship initiated based on a second user performing an interaction operation on the first user, an initiation manner of the association relationship comprises at least one of the following: the first media content being shared by the second user to the first user via an instant messaging session; or the second user mentioning the first user by entering a prompt symbol during posting information about the first media content on an associated interface of the first media content;

presenting at least one of the following on the media content stream presenting interface of the first media content: a user identifier of the second user, or interaction information generated based on the interaction operation;

in response to a switching operation on the first media content, presenting the second media content on the media content stream presenting interface;

displaying a reply control on the media content stream presenting interface of the first media content;

in response to a triggering operation on the reply control, displaying an information inputting interface; and replying, based on the information inputting interface receiving second information of the first user and based on the second information, to the target second user in a reply manner corresponding to the initiation manner of the association relationship.

* * * * *